(12) United States Patent
Smith et al.

(10) Patent No.: US 6,942,303 B2
(45) Date of Patent: Sep. 13, 2005

(54) WHEEL ASSEMBLY

(75) Inventors: Bernard Smith, Livermore, CA (US);
Kirk A. Hoeppner, Concord, CA (US)

(73) Assignee: Pacific Coast Wheel Factory, Inc., Danville, CA (US)

( * ) Notice: Subject to any disclaimer, the term of this patent is extended or adjusted under 35 U.S.C. 154(b) by 6 days.

(21) Appl. No.: 10/741,942

(22) Filed: Dec. 19, 2003

(65) Prior Publication Data
US 2005/0062334 A1 Mar. 24, 2005

Related U.S. Application Data
(60) Provisional application No. 60/505,375, filed on Sep. 23, 2003.

(51) Int. Cl.[7] .................................. B60B 7/20
(52) U.S. Cl. .................. 301/37.25; 301/37.41
(58) Field of Search ............... 301/37.25, 58, 301/59, 110.5; 280/217; 310/166

(56) References Cited
U.S. PATENT DOCUMENTS

| | | | |
|---|---|---|---|
| 639,567 A | * 12/1899 | Henderson | ............ 280/217 |
| 1,599,117 A | * 9/1926 | Conlon | ............ 280/217 |
| 2,621,081 A | 12/1952 | Mann | |
| 2,762,469 A | 9/1956 | Lyon | |
| 3,219,391 A | 11/1965 | Hettinger | |
| 3,565,489 A | 2/1971 | Eirinberg | |
| 3,722,958 A | 3/1973 | Marshall | |
| 3,787,066 A | * 1/1974 | Hautier | ............ 280/217 |
| 3,847,443 A | 11/1974 | Laurion | |
| 4,121,851 A | 10/1978 | Finkenbiner | |
| 4,209,230 A | 6/1980 | Perkins | |
| 4,678,239 A | 7/1987 | Matsushita | |
| 5,290,094 A | 3/1994 | Gragg | |
| 6,486,582 B1 | * 11/2002 | Patarchi | ............ 310/166 |
| 2002/0036426 A1 | 3/2002 | Fowlkes | |

* cited by examiner

Primary Examiner—Russell D. Stormer
(74) Attorney, Agent, or Firm—Blakely Sokoloff Taylor & Zafman; Stephen M. De Klerk

(57) ABSTRACT

A wheel assembly is provided. The wheel assembly includes a wheel of the kind that may be mounted to a frame of a bicycle. The wheel assembly also has a spinning component mounted with a bearing on to a hub of the wheel. The spinning component has a plurality of radially extending, angularly-spaced components. The spinning component is set in motion when the wheel turns, and continues spinning for a period of time when the wheel is brought to a stop.

11 Claims, 4 Drawing Sheets

WHEEL ASSEMBLY

CROSS-REFERENCE TO RELATED APPLICATIONS

The present patent application claims priority from provisional patent application No. 60/505,375, filed on Sep. 23, 2003, which is incorporated herein by reference in its entirety.

BACKGROUND OF THE INVENTION

This invention relates to a wheel assembly of the kind that may be used on a bicycle.

SUMMARY OF THE INVENTION

The invention provides a wheel assembly, which includes a stationary central shaft having first and second axially opposing ends securable to first and second spaced portions of a frame, a wheel, including an inner hub around the shaft, a circular outer rim around and in a radially spaced position relative to the hub, and at least a first alignment structure having at least one piece with an inner portion secured to the hub and an outer portion secured to the rim to secure the rim in the radially spaced position relative to the hub, so that the hub, rim, and alignment structure of the wheel revolve as a unit around an axially-extending axis of the shaft, and a spinning component mounted in a location to be at least partially visible from a position external to the wheel, revolving about the axis and at least partially rotatable relative to the wheel.

At least the first end of the shaft may have thread formed thereon to allow for a nut to be turned thereon and secure the first end to the frame.

The wheel assembly may include at least a first hub bearing having first and second races and roller members between the races to allow the races to rotate relative to one another, the first race being mounted to the shaft and the second race being mounted to the hub, rotation of the races relative to one another allowing for the hub to revolve around the shaft.

The wheel may include a second alignment structure having at least one piece with an inner portion secured to the hub and an outer portion secured to the rim, the pieces of the first and second alignment structures extending from first and second axially spaced ends of the hub, respectively, to the rim.

The spinning component is located between the alignment structures.

The wheel assembly of may further include a spinning component bearing between the first and second alignment structures having first and second races and roller members between the races to allow the races to rotate relative to one another, the first race being mounted to the hub and the second race being mounted to the spinning component, rotation of the races relative to one another allowing for the spinning component to revolve around the hub.

The spinning component may include a plurality of radially extending members circumferentially alternated by gaps.

The invention also provides a wheel assembly which includes a wheel including an inner hub having first and second axially spaced ends, a circular outer rim around and in a radially spaced position relative to the hub, a first alignment structure having at least one piece with an inner portion secured to the first end of the hub and an outer portion secured to the rim, a second alignment structure having at least one piece with an inner portion secured to the second end of the hub, and an outer portion secured to the rims, a spinning component bearing having first and second races and roller members between the races to allow for the second race to rotate relative to the first race, the first race being mounted to the hub between the first and second ends thereof, and a spinning component having an inner portion mounted to the second race and an outer portion revolving together with the inner portion relative to the wheel, and being in a location to be at least partially visible when revolving on the bearing relative to the wheel and viewed from a location external to the wheel.

The invention further provides a wheel assembly which includes a stationary central shaft having first and second axially opposing ends, respectively being insertable into first and second spaced formations of a frame, at least the first end having thread formed thereon to allow for a nut to be turned thereon and secure to the end to the respective formation, a wheel including an inner hub around the shaft and having first and second axially opposing ends, a circular outer rim around and in a radially spaced position relative to the hub, first and second sets of spokes, each spoke having an inner end secured to the hub and an outer end secured to the rim, the first set of spokes extending from the first end of the hub to the rim and the second set of spokes extending from the second end of the hub to the rims, a spinning component bearing having first and second races and roller members between the races to allow for the second race to rotate relative to the first race, the first race being mounted to the hub between the first and second ends thereof, and a spinning component having an inner portion mounted to the second race and an outer portion revolving together with the inner portion relative to the shaft and wheel and being in a location between the first and second sets of spokes, being at least partially visible through gaps between at least the first spokes when revolving on the bearing relative to the wheel and viewed from a location external to the wheel.

BRIEF DESCRIPTION OF THE DRAWINGS

The invention is further described by way of example with reference to the accompanying drawings, wherein.

DETAILED DESCRIPTION OF THE INVENTION

Figure 1:
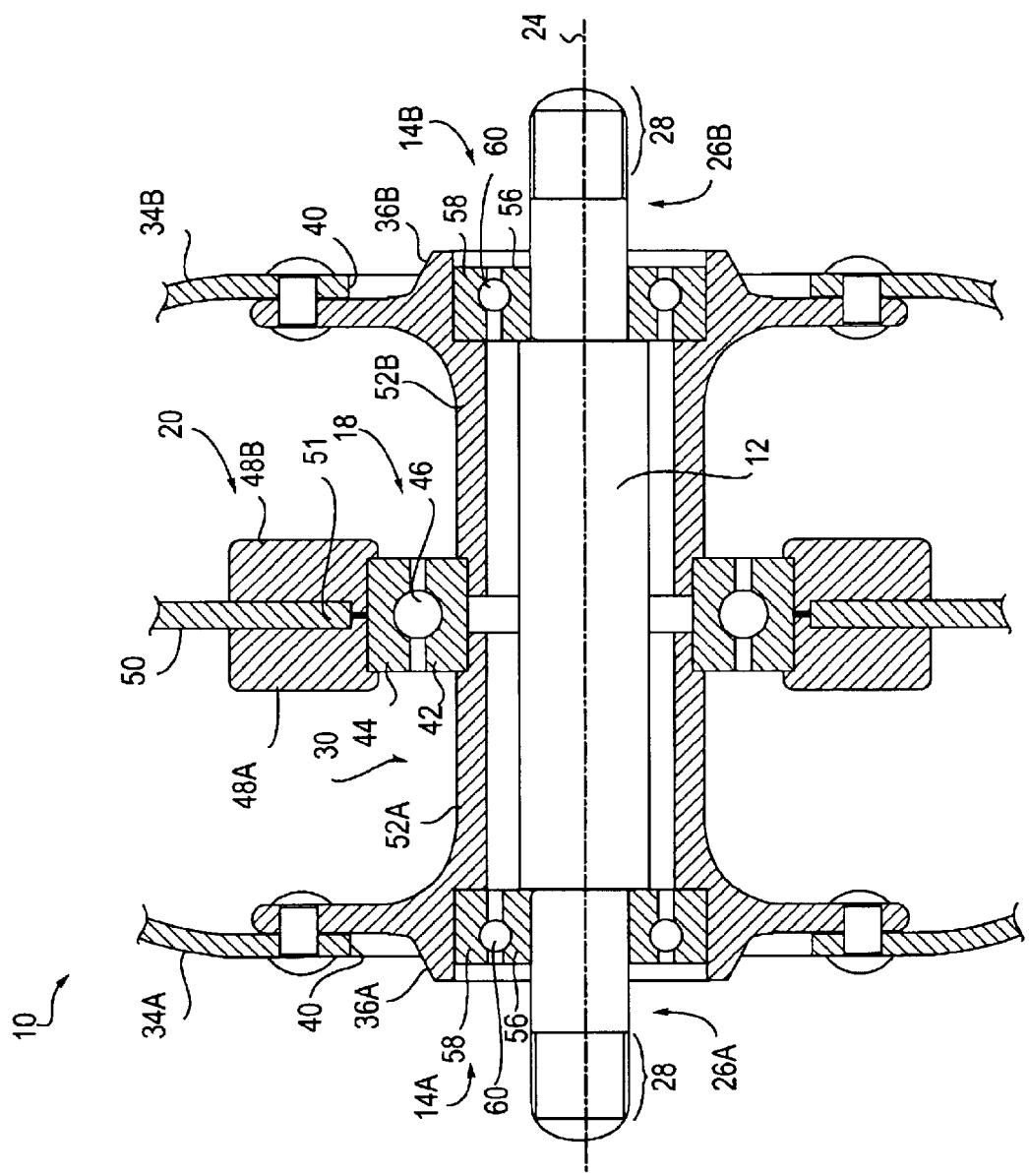
FIG. 1 is a cross-sectional front view of components of a wheel construction, according to an embodiment of the invention.
Figure 2:
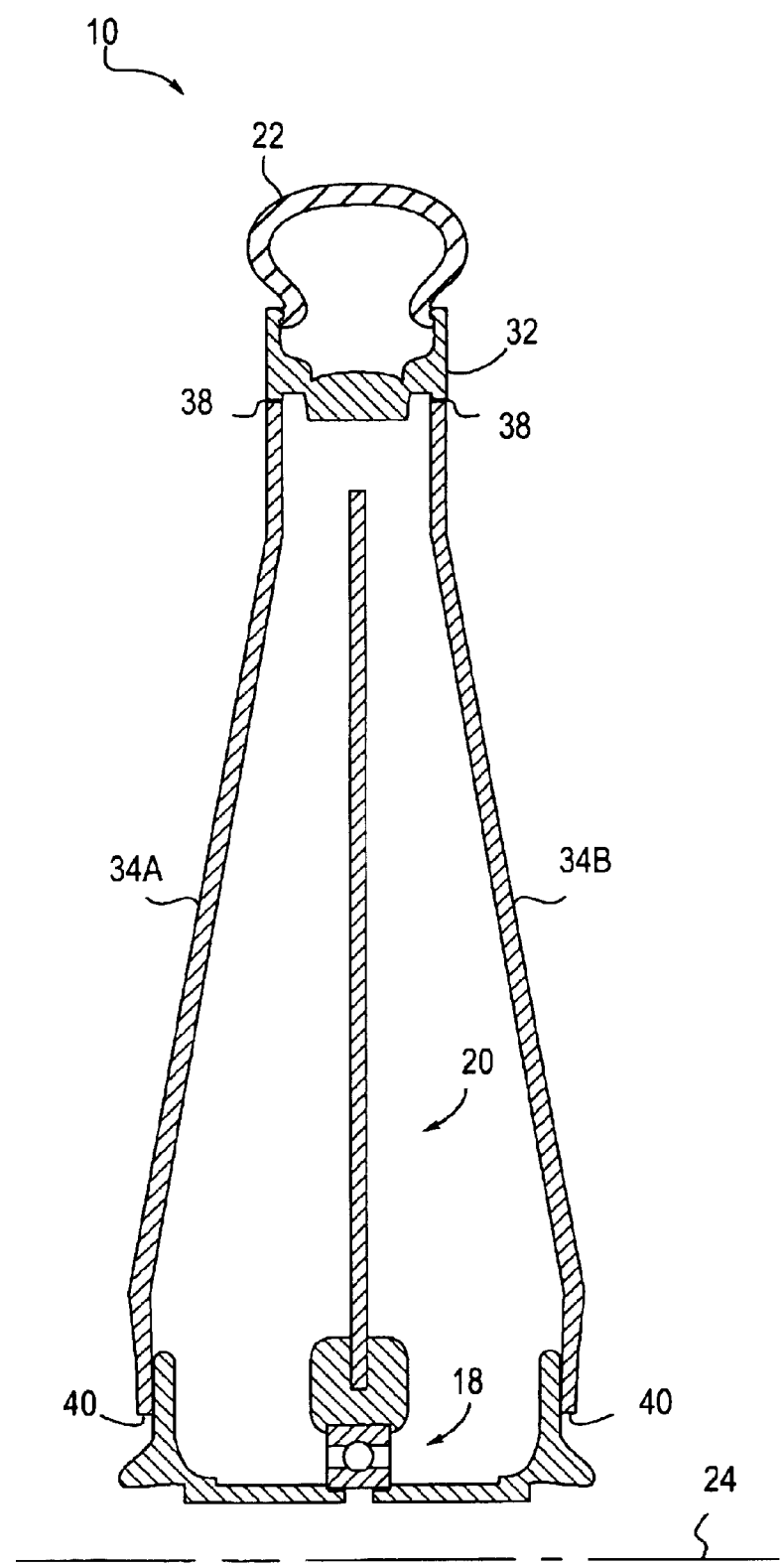
FIG. 2 is a cross-sectional front view of a top half of the wheel construction.

FIGS. 1 and 2 of the accompanying drawings illustrate a wheel assembly 10, according to an embodiment of the invention, including a stationary central shaft 12, first and second hub bearings 14A and 14B, a wheel 16, a spinning component bearing 18, a spinning component 20, and a tire 22.

The shaft 12 has a central axis 24 extending axially therethrough, and about which the wheel 16 revolves. The shaft 12 has first and second opposing ends 26A and 26B. Each end 26A and 26B has a respective section of thread 28 formed thereon.

The wheel 16 includes an inner hub 30, and outer circular rim 32, and first and second alignment structures 34A and 34B. The hub 30 has first and second axially opposing ends 36A and 36B. The rim 32 is located around the hub 30 and in a radially spaced position relative to the hub 30, so that an axis of the rim 32 coincides with an axis of the hub 30.

Each alignment structure 34 is made of a lightweight reflective plate material such as aluminum. The plate material has a circular outer edge 38, and has a circular central opening 40 formed therein. A portion of the respective alignment structure 34A or 34B at its respective outer edge 38 is secured to the rim 32, and a portion of the respective alignment structure 34A or 34B at the central opening 40 is secured to the hub 30. The first alignment structure 34A is secured to the first end 36A of the hub 30, and the second alignment end 34B is secured to the second end 36B of the hub 30.

The spinning component bearing 18 includes inner and outer races 42 and 44, and roller ball members in the form of spherical roller ball bearings 46 between the races 42 and 44. The roller ball bearings 46 align the races 42 and 44 relative to one another, and allow for the outer race 44 to revolve concentrically relative to the inner race 42.

The spinning component 20 includes first and second mounting pieces 48A and 48B, and a plate member 50. The plate member 50 has a circular central opening 51 located over the outer race 44 of the spinning component bearing 18. The first and second mounting pieces 48A and 48B are brought together and secured to one another so that the plate member 50 is secured between the first and second mounting pieces 48A and 48B, and the first and second mounting pieces 48A and 48B are secured to the outer race 44.

The hub 30 includes first and second portions 52A and 52B. The first and second portions 52A and 52B are brought together during the manufacture of the wheel 16 until the inner race 42 is secured between the first and second portions 52A and 52B. With the spinning component 20 secured to the outer race 44 and the hub 30 secured to the inner race 42, the spinning component 20 can revolve freely around the hub 30 and between the first and second alignment structures 34A and 34B.

The shaft 12 is inserted into the hub 30. The hub bearings 14A and 14B are used to align the central axis 24 of the shaft 12 with a central axis of the wheel 16. Each bearing 14A or 14B has a respective inner race 56 on a respective one of the ends 26A or 26B, a respective outer race 58 against a respective one of the ends 36A or 36B, and a plurality of roller ball bearings 60 between the races 56 and 58 to allow for the outer race to revolve concentrically relative to the inner race 56. The components of the wheel 16 can thus revolve as a unit around the shaft 12.

The tire 22 is placed on the rim 32 and inflated. The wheel assembly 10 can then be secured to a frame of a bicycle. The ends 56A and 56B are inserted into spaced formations of a frame of the bicycle. A respective nut is then turned onto the thread 28 of each respective end 26A and 26B to secure the shaft 12 is stationary, i.e., a non-rotating position on the frame.

Figure 3:
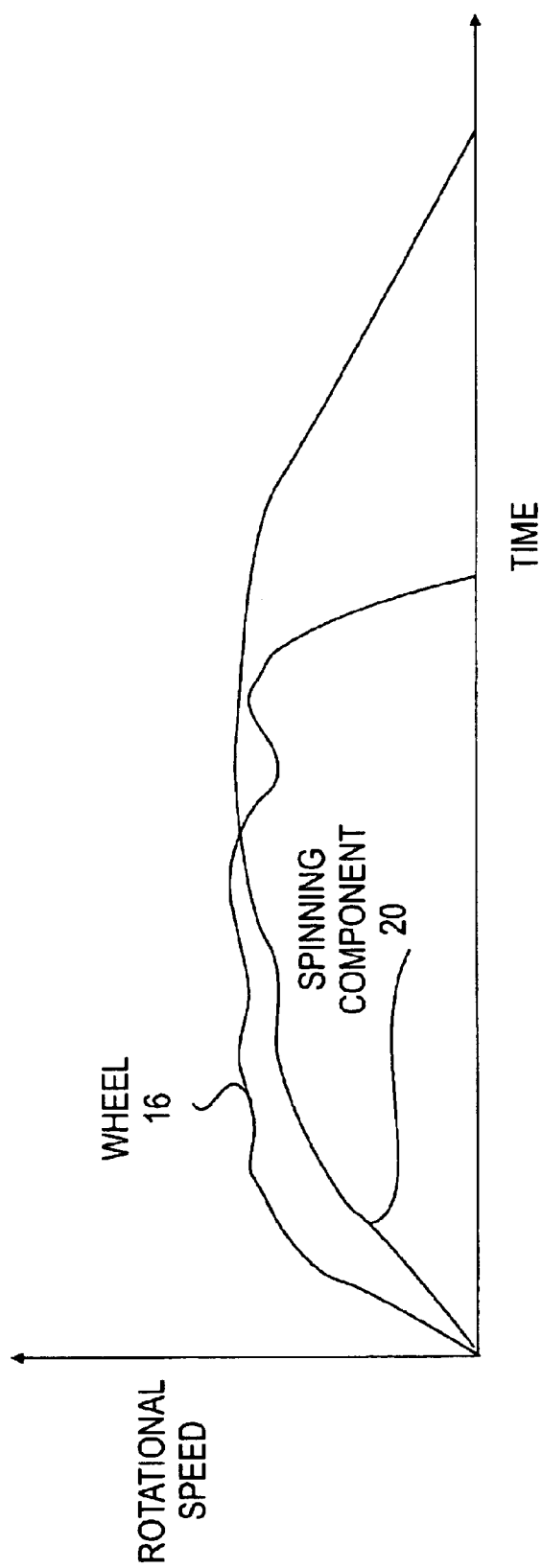
FIG. 3 is a graph illustrating rotational speed of a wheel and a spinning component of the wheel construction.

FIG. 3 illustrates how the wheel 16 and spinning component 20 function. When the bicycle is set in motion and the wheel 16 starts rotating, a small degree of friction in the spinning component bearing 18 gradually sets the spinning component 20 in motion. The rotational speed of the spinning component 20 approaches that of the wheel 16 within a few seconds. When the bicycle is brought to a stop and the wheel 16 stops rotating, the spinning component 20 continues to revolve relative to the stationary wheel 16 until, after a period of about 10 to 15 seconds, the spinning component 20 eventually comes to a stop.

Figure 4:
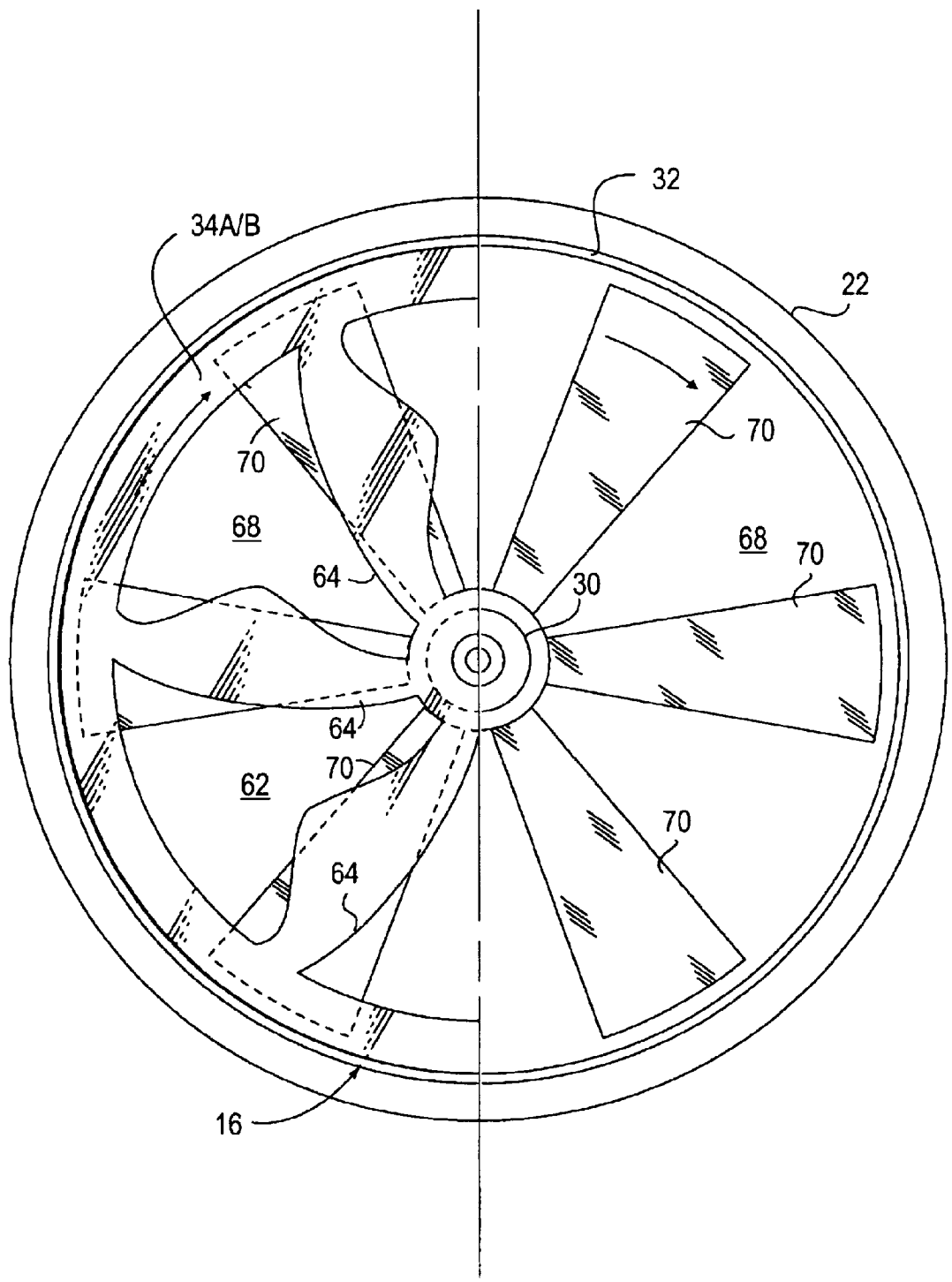
FIG. 4 is a partially sectioned side view of the wheel construction.

As illustrated in FIG. 4, each alignment structure 34A or 34B has a plurality of gaps 62 formed therein to leave a plurality of radially extending spokes 64. Each spoke 64 extends from the hub 30 to the rim 32, and the spokes 64 are circumferentially spaced relative to one another. Surfaces of the spokes 64 are highly reflective.

The plate member 50 has a plurality of gaps 68 cut therein to leave a plurality of radially extending and angularly spaced members 70. Portions of the members 70 are visible through the gaps 62 from a location external to the wheel 16. A person at such a location can also see the members 70 revolving relative to the wheel 16, e.g., when the wheel 16 stops rotating after a period of rotation and the spinning component 20 continues to revolve. The members 70 are highly reflective, so that a front spoke is reflected therefrom, thus creating the impression that a spoke behind the front spoke does not disappear when the respective member 70 covers the spoke at the back.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A wheel assembly, comprising:
    a stationary central shaft having first and second axially opposing ends securable to first and second spaced portions of a frame;
    a wheel including an inner hub around the shaft, a circular outer rim around and in a radially spaced position relative to the hub, and at least a first alignment structure having at least one piece with an inner portion secured to the hub and an outer portion secured to the rim to secure the rim in the radially spaced position relative to the hub, so that the hub, rim, and alignment structure of the wheel revolve as a unit around an axially-extending axis of the shaft;
    a spinning component bearing having first and second races, and roller members between the races to allow the races to rotate relative to one another, the first race revolving with the wheel; and
    a spinning component mounted to the second race in a location to be at least partially visible from a position external to the wheel, revolving about the axis and, due to rotation of the races relative to one another, being at least partially rotatable relative to the wheel in the same direction as the wheel relative to the shaft.

2. The wheel assembly of claim 1, wherein at least the first end of the shaft has thread formed thereon to allow for a nut to be turned thereon and secure the first end to the frame.

3. The wheel assembly of claim 1, further comprising:
    at least a first hub bearing having first and second races and roller members between the races to allow the races to rotate relative to one another, the first race being mounted to the shaft and the second race being mounted to the hub, rotation of the races relative to one another allowing for the hub to revolve around the shaft.

4. The wheel assembly of claim 1, wherein the wheel includes a second alignment structure having at least one piece with an inner portion secured to the hub and an outer portion secured to the rim, the pieces of the first and second alignment structures extending from first and second axially spaced ends of the hub, respectively, to the rim.

5. The wheel assembly of claim 4, wherein the spinning component is located between the alignment structures.

6. The wheel assembly of claim 5, wherein the hub includes first and second portions that are brought together with the first race of the spinning component bearing between the first and second portions.

7. The wheel assembly of claim 1, wherein the spinning component includes a plurality of radially extending members circumferentially alternated by gaps.

8. The wheel assembly of claim 1, wherein the first race is a separate part from the wheel and is mounted to the wheel to revolve with the wheel.

9. A wheel assembly, comprising:
- a wheel including an inner hub having first and second axially spaced ends, a circular outer rim around and in a radially spaced position relative to the hub, a first alignment structure having at least one piece with an inner portion secured to the first end of the hub and an outer portion secured to the rim, a second alignment structure having at least one piece with an inner portion secured to the second end of the hub, and an outer portion secured to the rim;
- a spinning component bearing having first and second races and roller members between the races to allow for the second race to rotate relative to the first race, the first race being mounted to the hub between the first and second ends thereof; and
- a spinning component having an inner portion mounted to the second race and an outer portion revolving together with the inner portion relative to the wheel, and being in a location to be at least partially visible when revolving on the bearing relative to the wheel and viewed from a location external to the wheel.

10. A wheel assembly, comprising:
- a stationary central shaft having first and second axially opposing ends, respectively being insertable into first and second spaced formations of a frame, at least the first end having thread formed thereon to allow for a nut to be turned thereon and secure to the end to the respective formation;
- a wheel including an inner hub around the shaft and having first and second axially opposing ends, a circular outer rim around and in a radially spaced position relative to the hub, first and second sets of spokes, each spoke having an inner end secured to the hub and an outer end secured to the rim, the first set of spokes extending from the first end of the hub to the rim and the second set of spokes extending from the second end of the hub to the rim;
- a spinning component bearing having first and second races and roller members between the races to allow for the second race to rotate relative to the first race, the first race being mounted to the hub between the first and second ends thereof; and
- a spinning component having an inner portion mounted to the second race and an outer portion revolving together with the inner portion relative to the shaft and wheel and being in a location between the first and second sets of spokes, being at least partially visible through gaps between at least the first spokes when revolving on the bearing relative to the wheel and viewed from a location external to the wheel.

11. A wheel assembly, comprising:
- a stationary central shaft having first and second axially opposing ends securable to first and second spaced portions of a frame;
- a wheel including an inner hub around the shaft, a circular outer rim around and in a radially spaced position relative to the hub, and first and second alignment structures, each alignment structure having at least one piece with an inner portion secured to the hub and an outer portion secured to the rim to secure the rim in the radially spaced position relative to the hub, so that the hub, rim, and alignment structures of the wheel revolve as a unit around an axially-extending axis of the shaft;
- a spinning component bearing having first and second races, and roller members between the races to allow the races to rotate relative to one another, the hub having first and second portions that are brought together with the first race between the first and second portions to mount the first race to the hub of the wheel; and
- a spinning component mounted to the second race in a location between the first and second alignment structures and being at least partially visible from a position external to the wheel, revolving about the axis and, due to rotation of the races relative to one another, being at least partially rotatable relative to the wheel.

* * * * *